United States Patent
Okabe

(10) Patent No.: US 10,597,026 B2
(45) Date of Patent: Mar. 24, 2020

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventor: Yasuaki Okabe, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 182 days.

(21) Appl. No.: 15/958,098

(22) Filed: Apr. 20, 2018

(65) Prior Publication Data

US 2018/0304881 A1    Oct. 25, 2018

(30) Foreign Application Priority Data

Apr. 25, 2017 (JP) ................. 2017-086156

(51) Int. Cl.
| | |
|---|---|
| *B60W 20/15* | (2016.01) |
| *B60W 10/06* | (2006.01) |
| *B60W 10/08* | (2006.01) |
| *B60K 6/365* | (2007.10) |
| *B60W 30/18* | (2012.01) |
| *B60L 50/15* | (2019.01) |
| *B60W 20/10* | (2016.01) |
| *B60L 50/16* | (2019.01) |
| *B60K 6/445* | (2007.10) |
| *B60L 53/126* | (2019.01) |
| *B60W 20/00* | (2016.01) |

(52) U.S. Cl.
CPC ............ *B60W 20/15* (2016.01); *B60K 6/365* (2013.01); *B60K 6/445* (2013.01); *B60L 50/15* (2019.02); *B60L 50/16* (2019.02); *B60L 53/126* (2019.02); *B60W 10/06* (2013.01); *B60W 10/08* (2013.01); *B60W 20/00* (2013.01); *B60W 20/10* (2013.01); *B60W 30/18072* (2013.01); *B60W 2510/0638* (2013.01); *B60W 2540/10* (2013.01); *B60W 2710/0627* (2013.01); *B60W 2710/081* (2013.01); *B60Y 2200/92* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 2018/0216552 | A1* | 8/2018 | Yokoi | F02D 41/123 |
| 2018/0222322 | A1* | 8/2018 | Shimizu | B60K 6/445 |
| 2018/0222327 | A1* | 8/2018 | Hosokawa | B60W 10/08 |
| 2018/0222329 | A1* | 8/2018 | Shimizu | B60L 50/16 |

FOREIGN PATENT DOCUMENTS

JP    2013-203116 A    10/2013

OTHER PUBLICATIONS

U.S. Appl. No. 15/907,524, filed Feb. 28, 2018 Inventor: Daiki Takayama Title: Hybrid Vehicle and Control Method Therefor.

\* cited by examiner

*Primary Examiner* — Richard M Camby
(74) *Attorney, Agent, or Firm* — Sughrue Mion, PLLC

(57) ABSTRACT

A hybrid vehicle in which a first inverter is turned on in three phases and injection of fuel of an engine is stopped when an accelerator is turned off during predetermined traveling in which the hybrid vehicle is traveling with gates of the first inverter and the second inverter cut off and with the engine operating is provided. Accordingly, when an accelerator is turned off during the predetermined traveling, it is possible to rapidly decrease a drag torque of a first motor.

7 Claims, 5 Drawing Sheets

HYBRID VEHICLE AND CONTROL METHOD THEREFOR

CROSS-REFERENCE TO RELATED APPLICATIONS

This application claims priority to Japanese Patent Application No. 2017-086156 filed on Apr. 25, 2017, which is incorporated herein by reference in its entirety.

BACKGROUND

1. Technical Field

The disclosure relates to a hybrid vehicle and a control method therefor.

2. Description of Related Art

In the related art, a hybrid vehicle including an engine, a first motor, a planetary gear set in which the engine, the first motor, and an output member connected to the engine, the first motor, and drive wheels are connected to a carrier, a sun gear, and a ring gear of the planetary gear set, a second motor that is connected to the output member, a first inverter that drives the first motor, a second inverter that drives the second motor, and a power storage device (a battery) that is connected to the first inverter and the second inverter via power lines has been proposed (for example, see Japanese Unexamined Patent Application Publication No. 2013-203116 (JP 2013-203116 A)). In this hybrid vehicle, when the hybrid vehicle is traveling with the gates of the first inverter and the second inverter cut off and with the engine operating, the engine is controlled such that a counter electromotive voltage which is generated with rotation of the first motor becomes higher than a DC-side voltage of the first inverter based on DC-side voltages of the first inverter and the second inverter, a rotation speed of the output member, and an accelerator operation amount. Through this control, a braking torque based on the counter electromotive voltage of the first motor is adjusted and a reaction torque (a driving torque generated in the output member) with respect to the braking torque is adjusted. In the hybrid vehicle, when the hybrid vehicle is traveling with the gates of the first and second inverters cut off and with the engine operating and an accelerator is turned off, the rotation speed of the engine is decreased such that the rotation speed of the first motor becomes equal to or less than a predetermined rotation speed (a rotation speed at which the counter electromotive voltage of the first motor is equal to or less than the DC-side voltage of the first inverter), and outputting of the reaction torque (the driving torque) to the output member is stopped.

SUMMARY

In a hybrid vehicle, when the hybrid vehicle is traveling with the gates of the first and second inverters cut off and with the engine operating and the accelerator is turned off, a drag torque (a mechanical loss) is generated in the first motor due to rotation of the first motor and a reaction torque (a driving torque) with respect to the drag torque is output to the output member even if the rotation speed of the first motor is equal to or less than a predetermined rotation speed. Since the drag torque is smaller when the rotation speed of the first motor is lower than when the rotation speed of the first motor is high, there is demand for rapidly decreasing the rotation speed of the first motor to more rapidly decrease the drag torque.

In consideration of the above-mentioned circumstances, the disclosure provides a hybrid vehicle that performs control such that a drag torque of a first motor is rapidly decreased when an accelerator is turned off during predetermined traveling in which the hybrid vehicle is traveling with the gates of a first inverter and a second inverter cut off and with an engine operating, and a control method therefor.

According to an aspect of the disclosure, there is provided a hybrid vehicle including an engine, a first motor, a second motor, a planetary gear set, a first inverter, a second inverter, a power storage device, and an electronic control unit. The first motor is configured to generate a counter electromotive voltage with rotation of the first motor. The second motor is configured to input and output power to and from a drive shaft connected to an axle of the hybrid vehicle. In the planetary gear set, three rotary elements are connected to three shafts of the first motor, the engine, and the drive shaft such that the first motor, the engine, and the drive shaft are arranged in the order of the first motor, the engine, and the drive shaft in a nomogram. The first inverter is configured to drive the first motor. The second inverter is configured to drive the second motor. The power storage device is connected to the first inverter and the second inverter via power lines. The electronic control unit is configured: (i) to control the engine, the first inverter, and the second inverter, and (ii) to turn on the first inverter in three phases and to stop injection of fuel of the engine when an accelerator is turned off during predetermined traveling in which the hybrid vehicle is traveling with gates of the first inverter and the second inverter cut off and with the engine operating.

According to another aspect of the disclosure, there is provided a control method of a hybrid vehicle including an engine, a first motor, a second motor, a planetary gear set, a first inverter, and a second inverter. Here, the first motor is configured to generate a counter electromotive voltage with rotation of the first motor. The second motor is configured to input and output power to and from a drive shaft connected to an axle of the hybrid vehicle. In the planetary gear set, three rotary elements are connected to three shafts of the first motor, the engine, and the drive shaft such that the first motor, the engine, and the drive shaft are sequentially arranged in that order in a nomogram. The first inverter is configured to drive the first motor. The second inverter is configured to drive the second motor. The control method includes: (i) controlling the engine, the first inverter, and the second inverter and (ii) turning on the first inverter in three phases and stopping injection of fuel of the engine when an accelerator is turned off during predetermined traveling in which the hybrid vehicle is traveling with gates of the first inverter and the second inverter cut off and with the engine operating.

With the hybrid vehicle and the control method therefor according to the disclosure, when an accelerator is turned off in the predetermined traveling in which the hybrid vehicle is traveling with the gates of the first inverter and the second inverter cut off and with the engine operating, the first inverter is turned on in three phases and the injection of fuel of the engine is stopped. Here, the gates may be cut off by turning off all transistors of the first inverter and the second inverter. The first inverter may be turned on in three phases by turning on all transistors on any one of upper-arm transistors and lower-arm transistors of the first inverter. By turning on the first inverter in three phases and stopping the injection of fuel of the engine, the rotation speed of the first motor is decreased with a torque based on a friction torque of the engine and a torque in a direction in which an absolute value of the rotation speed of the first motor decreases due to turning on of the first inverter in three phases. Accordingly, it is possible to more rapidly decrease the rotation speed of the first motor than that in a case in which the rotation speed of the first motor is decreased by controlling the rotation speed of the engine with the gates cut off and with the engine operating. As a result, it is possible to rapidly reduce a drag torque (a mechanical loss) of the first motor.

In the hybrid vehicle according to the disclosure, when the first inverter is turned on in three phases and the injection of fuel of the engine is stopped by turning off the accelerator during the predetermined traveling and the rotation speed of the engine reaches an autonomous allowable rotation speed, the electronic control unit may cut off the gates of the first inverter and restart the injection of fuel of the engine to travel in the predetermined traveling. Accordingly, it is possible to prevent the rotation speed of the engine from becoming less than the autonomous allowable rotation speed.

In the hybrid vehicle according to the disclosure, when the accelerator is turned on in a state in which, by turning off the accelerator during the predetermined traveling, the first inverter is turned in three phases and the injection of fuel of the engine is stopped the electronic control unit may cut off the gates of the first inverter and restart the injection of fuel of the engine to travel in the predetermined traveling.

In the hybrid vehicle according to the disclosure, when the accelerator is turned off during the predetermined traveling and a braking torque is output to the drive shaft, the electronic control unit may maintain the rotation speed of the first motor within a predetermined rotation speed range by stopping the injection of fuel of the engine and turning on the first inverter in three phases. Accordingly, it is possible to output friction of the engine as a braking torque to the drive shaft via the planetary gear set.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
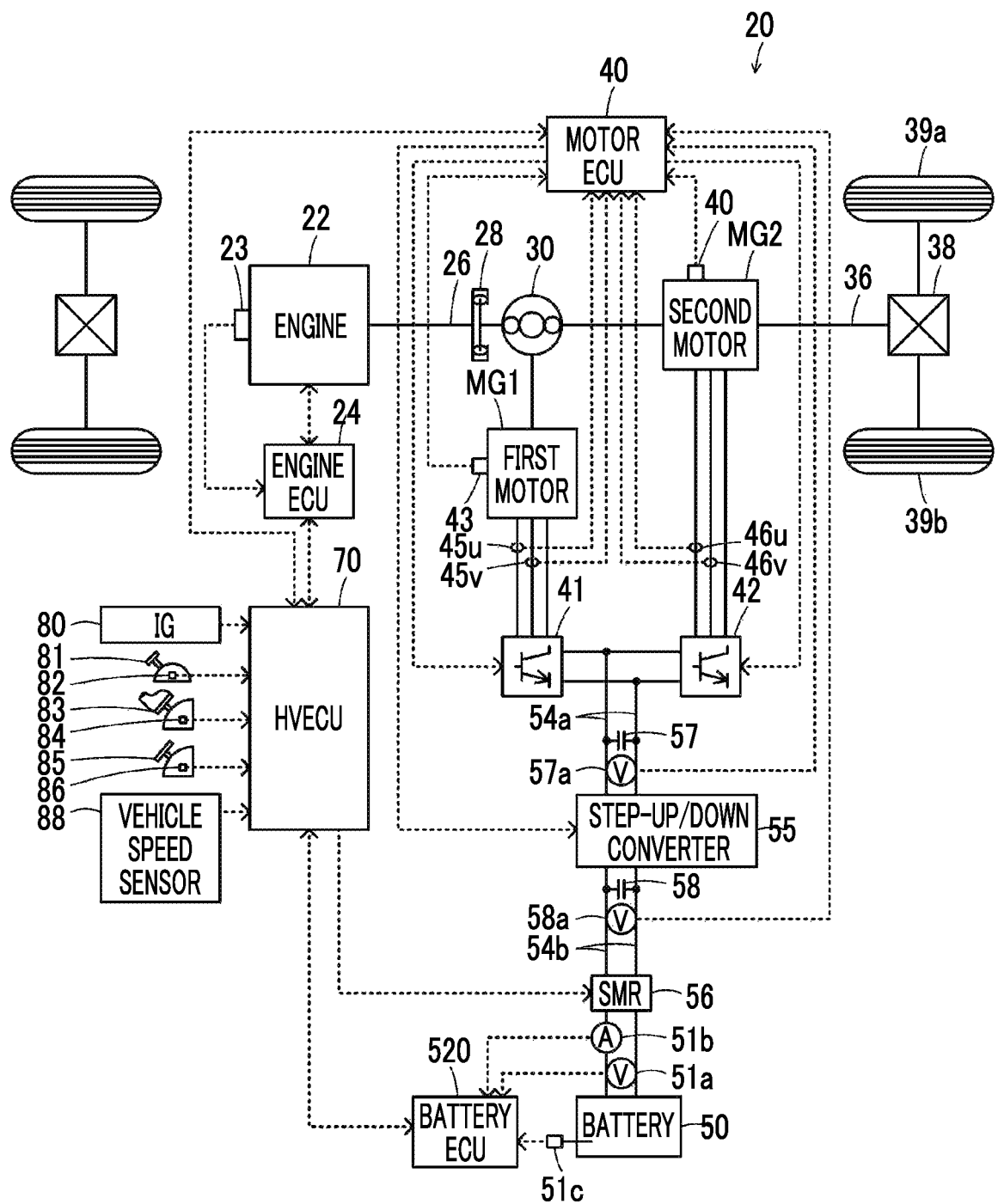
FIG. 1 is a diagram schematically illustrating a configuration of a hybrid vehicle 20 according to an embodiment of the disclosure.
Figure 2:
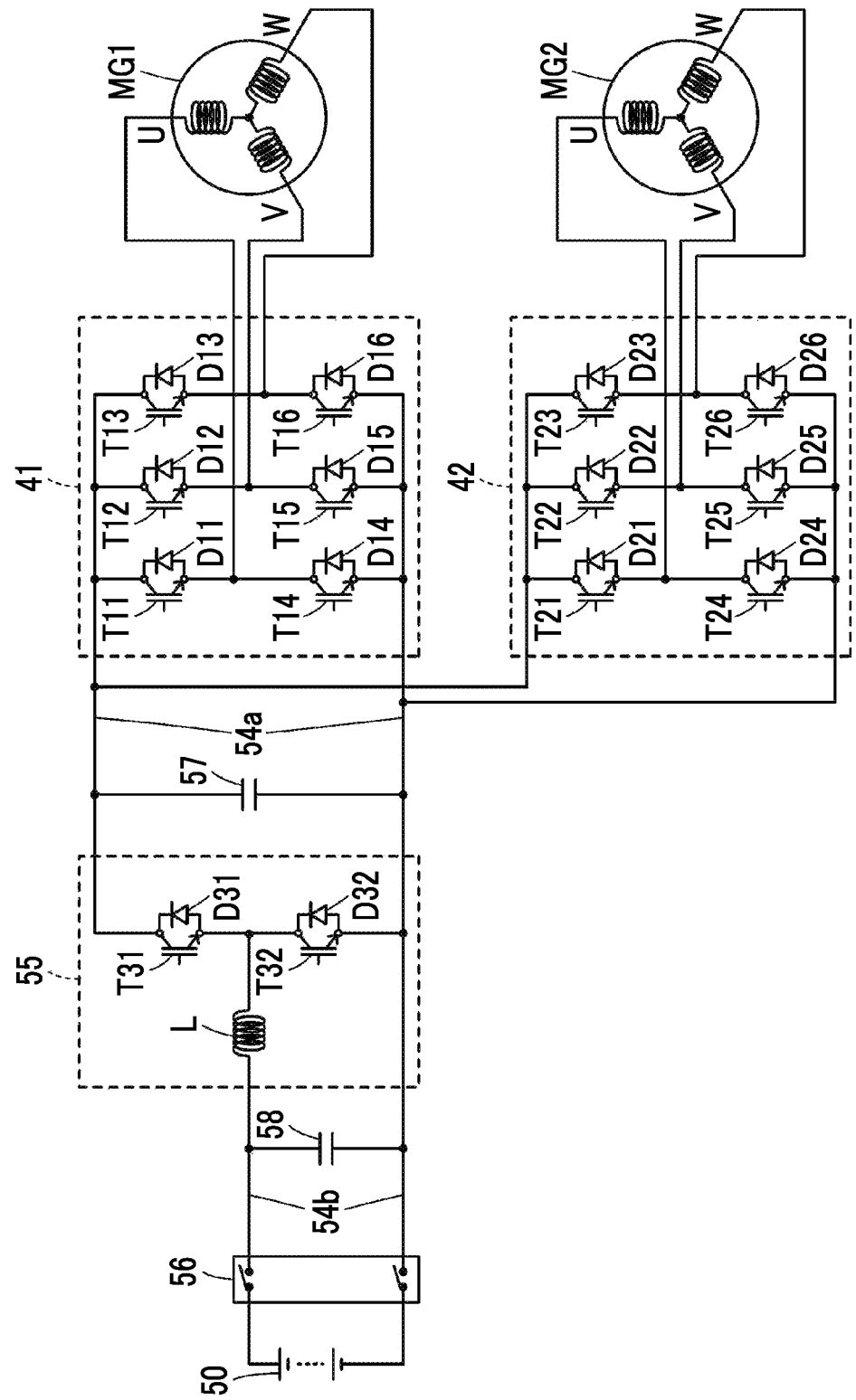
FIG. 2 is a diagram schematically illustrating a configuration of an electric machine driving system including a first motor MG1 and a second motor MG2 illustrated in FIG. 1.

FIG. 1 is a diagram schematically illustrating a configuration of a hybrid vehicle 20 according to an embodiment of the disclosure. FIG. 2 is a diagram schematically illustrating a configuration of an electrical machinery driving system including a first motor MG1 and a second motor MG2. As illustrated in the drawings, the hybrid vehicle 20 according to the embodiment includes an engine 22, a planetary gear set 30, a first motor MG1, a second motor MG2, a first inverter 41, a second inverter 42, a step-up/down converter 55, a battery 50 as a power storage device, a system main relay 56, a motor electronic control unit (hereinafter referred to as a "motor ECU") 40, and a hybrid electronic control unit (hereinafter referred to as an "HVECU") 70.

The engine 22 is configured as an internal combustion engine that outputs power using gasoline or diesel as fuel. Operation of the engine 22 is controlled by an engine electronic control unit (hereinafter referred to as an "engine ECU") 24.

Although not illustrated in the drawings, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22, for example, a crank angle θcr from a crank position sensor 23 that detects a rotational position of a crank shaft 26 of the engine 22, are input to the engine ECU 24 via the input port. Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle θcr from the crank position sensor 23.

The planetary gear set 30 is configured as a single pinion type planetary gear mechanism. A rotor of the first motor MG1 is connected to a sun gear of the planetary gear set 30. A drive shaft 36 connected to driving wheels 39a and 39b via a differential gear 38 is connected to a ring gear of the planetary gear set 30. The crank shaft 26 of the engine 22 is connected to a carrier of the planetary gear set 30 via a damper 28.

The first motor MG1 is configured as a synchronous generator motor including a rotor that has a permanent magnet embedded therein and a stator on which three-phase coils are wound, and the rotor thereof is connected to the sun gear of the planetary gear set 30 as described above. The second motor MG2 is configured as a synchronous generator motor similarly to the first motor MG1 and a rotor thereof is connected to the drive shaft 36.

The first inverter 41 and the second inverter 42 are used to drive the first motor MG1 and the second motor MG2. As illustrated in FIG. 2, the first inverter 41 is connected to power lines 54a on a high voltage side and includes six transistors T11 to T16 and six diodes D11 to D16 that are connected in parallel to the six transistors T11 to T16. The transistors T11 to T16 are arranged as pairs of two transistors to serve as a source side and a sink side with respect to a positive electrode line and a negative electrode line of the power lines 54a on the high voltage side. Each junction between the transistors constituting a pair in the transistors T11 to T16 is connected to the corresponding three-phase coil (a U phase, a V phase, or a W phase) of the first motor MG1. Accordingly, when a voltage is applied to the first inverter 41, an ON-time ratio of the transistors T11 to T16 constituting each pair is adjusted by the motor ECU 40, whereby a rotating magnetic field is formed in the three-phase coils and the first motor MG1 is rotationally driven. Similarly to the first inverter 41, the second inverter 42 is connected to the power lines 54a on the high voltage side and includes six transistors T21 to T26 and six diodes D21 to D26. When a voltage is applied to the second inverter 42, an ON-time ratio of the transistors T21 to T26 constituting each pair is adjusted by the motor ECU 40, whereby a rotating magnetic field is formed in the three-phase coils and the second motor MG2 is rotationally driven.

The step-up/down converter 55 is connected to the power lines 54a on the high voltage side and power lines 54b on a low voltage side and includes two transistors T31 and T32, two diodes D31 and D32 that are connected in parallel to the two transistors T31 and T32, and a reactor L. The transistor T31 is connected to the positive electrode line of the power lines 54a on the high voltage side. The transistor T32 is connected to the transistor T31 and the negative electrode lines of the power lines 54a on the high voltage side and the power lines 54b on the low voltage side. The reactor L is connected to a junction point between the transistors T31 and T32 and the positive electrode line of the power lines 54b on the low voltage side. When an ON-time ratio of the transistors T31 and T32 is adjusted by the motor ECU 40, the step-up/down converter 55 steps up electric power of the power lines 54b on the low voltage side and supplies the stepped-up power to the power lines 54a on the high voltage side or steps down electric power of the power lines 54a on the high voltage side and supplies the stepped-down power to the power lines 54b on the low voltage side. A smoothing capacitor 57 is attached to the positive electrode line and the negative electrode line of the power lines 54a on the high voltage side, and a smoothing capacitor 58 is attached to the positive electrode line and the negative electrode line of the power lines 54b on the low voltage side.

Although not illustrated in the drawings, the motor ECU 40 is configured as a microprocessor such as a CPU, and includes a ROM that stores a processing program, a RAM that temporarily stores data, input and output ports, and a communication port in addition to the CPU. As illustrated in FIG. 1, signals from various sensors which are required for controlling operation of the first motor MG1, the second motor MG2, and the step-up/down converter 55 are input to the motor ECU 40 via the input port. Examples of the signals input to the motor ECU 40 include a first rotational position $\theta m1$ and a second rotational position $\theta m2$ from a first rotational position sensor 43 and a second rotational position sensor 44 that detect rotational positions of the rotors of the first motor MG1 and the second motor MG2 and phase currents Iu1, Iv1, Iu2, and Iv2 from current sensors 45u, 45v, 46u, and 46v that detect currents flowing in phases of the first motor MG1 and the second motor MG2. Examples thereof further include a voltage (a voltage on a high voltage side) VH of the capacitor 57 (the power lines 54a on the high voltage side) from a voltage sensor 57a that is attached between the terminals of the capacitor 57 and a voltage (a voltage on a low voltage side) VL of the capacitor 58 (the power lines 54b on the low voltage side) from a voltage sensor 58a that is attached between the terminals of the capacitor 58. Various control signals for controlling operation of the first motor MG1, the second motor MG2, and the step-up/down converter 55 are output from the motor ECU 40 via the output port. Examples of the signals output from the motor ECU 40 include switching control signals for the transistors T11 to T16 and T21 to T26 of the first inverter 41 and the second inverter 42 and switching control signals for the transistors T31 and T32 of the step-up/down converter 55. The motor ECU 40 is connected to the HVECU 70 via the communication port. The motor ECU 40 calculates electrical angles $\theta e1$ and $\theta e2$, angular velocities $\omega m1$ and $\omega m2$, or rotation speeds Nm1 and Nm2 of the first motor MG1 and the second motor MG2 based on the first rotational position $\theta m1$ and the second rotational position $\theta m2$ of the rotors of the first motor MG1 and the second motor MG2 from the first rotational position sensor 43 and the second rotational position sensor 44.

The battery 50 is configured as a lithium-ion secondary battery or a nickel-hydride secondary battery and is connected to the power lines 54b on the low voltage side. The battery 50 is controlled by a battery electronic control unit (hereinafter referred to as a "battery ECU") 52.

Although not illustrated in the drawings, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. The state of charge SOC refers to a ratio of capacity of electric power which can be discharged from the battery 50 to the total capacity of the battery 50.

The system main relay 56 is disposed closer to the battery 50 than the capacitor 58 in the power lines 54b on the low voltage side. When ON and OFF thereof is controlled by the HVECU 70, the system main relay 56 connects or disconnects the battery 50 and the step-up/down converter 55.

Although not illustrated in the drawings, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples of the shift position SP include a parking position (a P position), a reverse position (an R position), a neutral position (an N position), and a drive position (a D position).

As described above, the HVECU 70 is connected to the engine ECU 24, the motor ECU 40, and the battery ECU 52 via the communication port.

In the hybrid vehicle 20 having the above-mentioned configuration, a required driving force of the drive shaft 36 is set based on the accelerator operation amount Acc and the vehicle speed V, and operations of the engine 22, the first motor MG1, and the second motor MG2 are controlled such that required power corresponding to the required driving force is output to the drive shaft 36. Operation modes of the engine 22, the first motor MG1, and the second motor MG2 include, for example, following Modes (1) to (3). Since a torque-conversion operation mode of (1) and a charging/discharging operation mode of (2) are modes in which the engine 22, the first motor MG1, and the second motor MG2 are controlled such that a required power is output to the drive shaft 36 with the engine 22 operating and there is no difference in substantial control, both operation modes are referred to as an engine operation mode. (1) Torque-conversion operation mode: A mode in which operation of the engine 22 is controlled such that power corresponding to the required power is output from the engine 22, and driving of the first motor MG1, and the second motor MG2 is controlled such that total power output from the engine 22 is torque-converted by the planetary gear set 30, the first motor MG1, and the second motor MG2 and the required power is output to the drive shaft 36. (2) Charging/discharging operation mode: A mode in which operation of the engine 22 is controlled such that power corresponding to the sum of the required power and electric power required for charging/discharging of the battery 50 is output from the engine 22, and driving of the first motor MG1 and the second motor MG2 is controlled such that total or some power output from the engine 22 is torque-converted by the planetary gear set 30, the first motor MG1, and the second motor MG2 with charging/discharging of the battery 50 and the required power is output to the drive shaft 36. (3) Motor operation mode: A mode in which operation of the engine 22 is stopped and driving of the second motor MG2 is controlled such that the required power is output to the drive shaft 36.

In the hybrid vehicle 20 according to the embodiment, when an abnormality occurs in the first inverter 41 and the second inverter 42 or the sensors (such as the first rotational position sensor 43 and the second rotational position sensor 44) which are used for controlling the first inverter 41 and the second inverter 42 during operating (rotating) of the engine 22, the hybrid vehicle travels by inverterless traveling (traveling in a limp home mode) with the gates of the first inverter 41 and the second inverter 42 cut off (all of the transistors T11 to T16 and T21 to T26 are turned off) and with the engine 22 operating.

When the accelerator is turned on during inverterless traveling, the HVECU 70 sets a target rotation speed Nm1* of the first motor MG1 to a predetermined rotation speed Nm1set and sets a target voltage VH* of the power lines 54a on a high voltage side to a predetermined voltage VHset such that the counter electromotive voltage Vcef1 generated with rotation of the first motor MG1 is higher than the voltage VH of the power lines 54a on a high voltage side. Here, the counter electromotive voltage Vcef1 of the first motor MG1 corresponds to a product of the angular velocity ωm1 and a counter electromotive voltage constant Km1 of the first motor MG1. For example, 4000 rpm, 5000 rpm, or 6000 rpm can be used as the predetermined rotation speed Nm1set. For example, 330 V, 350 V, or 370 V can be used as the predetermined voltage VHset.

Figure 3:
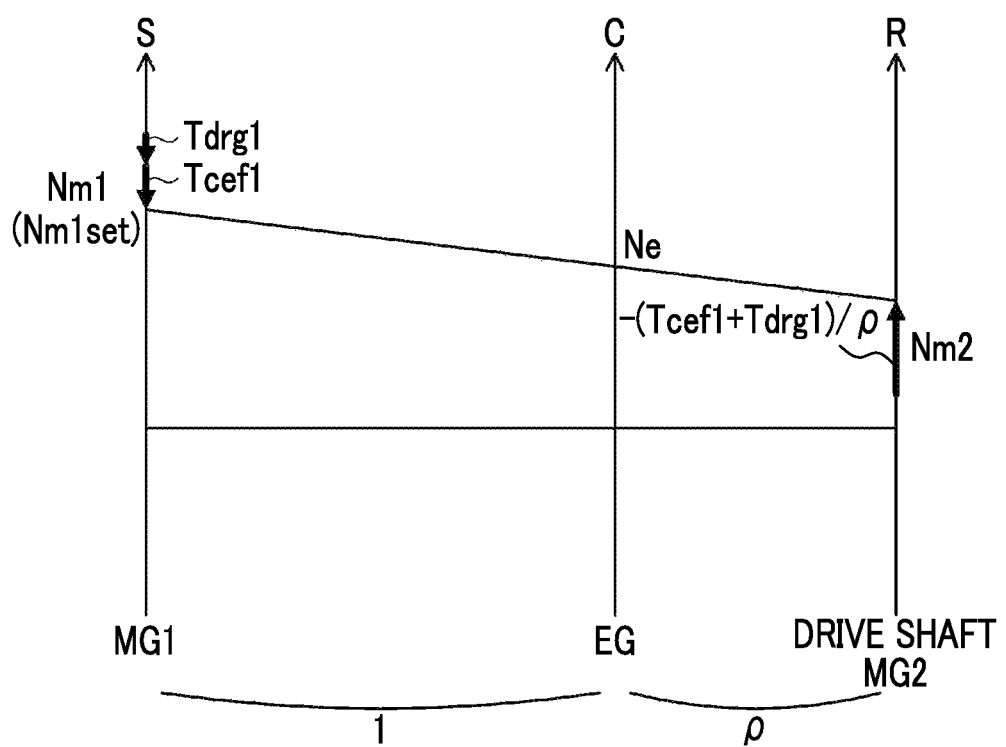
FIG. 3 is a diagram illustrating an example of a nomogram of a planetary gear set when a counter electromotive voltage of the first motor is higher than a voltage of power lines on a high voltage side in a state in which gates of a first inverter and a second inverter are cut off in FIG. 1.

FIG. 3 is a diagram illustrating an example of a nomogram of the planetary gear set 30 when the counter electromotive voltage Vcef1 of the first motor MG1 is higher than the voltage of the power lines 54a on the high voltage side in a state in which the gates of the first inverter 41 and the second inverter 42 are cut off. In the drawing, an S axis on the left side represents a rotation speed of the sun gear of the planetary gear set 30 which is the rotation speed Nm1 of the first motor MG1, a C axis represents a rotation speed of the carrier of the planetary gear set 30 which is the rotation speed Ne of the engine 22, and an R axis represents a rotation speed of the ring gear of the planetary gear set 30 which is the rotation speed Nm2 of the second motor MG2 (and the rotation speed Nd of the drive shaft 36). In the drawing, "ρ" represents a gear ratio (the number of teeth of the sun gear/the number of teeth of the ring gear) of the planetary gear set 30. As illustrated in the drawing, a drag torque (a mechanical loss) Tdrg1 is generated in the first motor MG1 when the first motor MG1 is rotating, and a regenerative torque Tcef1 based on the counter electromotive voltage Vcef1 in addition to the drag torque Tdrg1 is also generated in the first motor MG1 when the counter electromotive voltage Vcef1 of the first motor MG1 is higher than the voltage VH of the power lines 54a on a high voltage side. Accordingly, when the counter electromotive voltage Vcef1 of the first motor MG1 is higher than the voltage VH of the power lines 54a on a high voltage side, a reaction torque with respect to the regenerative torque Tcef1 and the drag torque Tdrg1 of the first motor MG1 (−(Tdrg1+Tcef1)/ρ) is output as a driving torque (a forward driving torque) to the drive shaft 36. The absolute value of the drag torque Tdrg1 of the first motor MG1 becomes larger as the absolute value of the rotation speed Nm1 of the first motor MG1. Specifically, the regenerative torque Tcef1 of the first motor MG1 is generated, when the first motor MG1 rotates by interlocking with the operation of the engine 22 and electric power based on the counter electromotive voltage Vcef1 of the first motor MG1 is rectified by the diodes D11 to D16 of the first inverter 41 and is supplied to the battery 50 via the power lines 54a on the high voltage side, the step-up/down converter 55, and the power lines 54b on the lower voltage side.

Although not illustrated in FIG. 3, a drag torque Tdrg2 is generated in the second motor MG2 and is output as a braking torque to the drive shaft 36 when the second motor MG2 is rotating, and a regenerative torque Tcef2 based on a counter electromotive voltage Vcef2 of the second motor MG2 in addition to the drag torque Tdrg2 is generated in the second motor MG2 and the total torque (Tdrge2+Tcef2) is output as a braking torque to the drive shaft 36 when the counter electromotive voltage Vcef2 of the second motor MG2 is higher than the voltage VH of the power lines 54a on the high voltage side. The absolute value of the drag torque Tdrg2 of the second motor MG2 becomes larger as the absolute value of the rotation speed Nm2 of the second motor MG2 becomes larger. The counter electromotive voltage Vcef2 of the second motor MG2 corresponds to a product of the angular velocity ωm2 of the second motor MG2 and a counter electromotive voltage constant Km2. Specifically, the regenerative torque Tcef2 of the second motor MG2 is generated, when electric power based on the counter electromotive voltage Vcef2 of the second motor MG2 is rectified by the diodes D21 to D26 of the second inverter 42 and is supplied to the battery 50 via the power lines 54a on the high voltage side, the step-up/down converter 55, and the power lines 54b on the lower voltage side.

When the target rotation speed Nm1* of the first motor MG1 is set in this way, the target rotation speed Ne* of the engine 22 is calculated by Equation (1) using the target rotation speed Nm1* of the first motor MG1, the rotation speed Nm2 of the second motor MG2 (the rotation speed Nd of the drive shaft 36), and the gear ratio p of the planetary gear set 30, and the calculated target rotation speed Ne* is transmitted to the engine ECU 24. Here, Equation (1) can be easily derived using FIG. 3. When the target rotation speed Ne* of the engine 22 is received, the engine ECU 24 performs intake air control, fuel injection control, and ignition control of the engine 22 such that the rotation speed Ne of the engine 22 reaches the target rotation speed Ne*. When the target voltage VH* of the power lines 54a on the high voltage side is set, the target voltage VH* is transmitted to the motor ECU 40. When the target voltage VH* is received, the motor ECU 40 controls switching of the transistors T31 and T32 of the step-up/down converter 55 such that the voltage VH of the power lines 54a on the high voltage side reaches the target voltage VH*.

$$Ne^* = (Nm1^* \times \rho + Nm2)/(1+\rho) \qquad (1)$$

In this way, by setting the counter electromotive voltage Vcef1 of the first motor MG1 to be higher than the voltage VH of the power lines 54a on the high voltage side when the accelerator is turned on, the hybrid vehicle can travel using the driving torque of the drive shaft 36 based on the regenerative torque Tcef1 and the drag torque Tdrg1 of the first motor MG1. The drag torque Tdrg2 of the second motor MG2 becomes larger as the vehicle speed V (the rotation speed Nm2 of the second motor MG2) becomes higher, and the regenerative torque Tcef2 of the second motor MG2 is output as a braking torque to the drive shaft 36 when the counter electromotive voltage Vcef2 of the second motor MG2 is higher than the voltage VH of the power lines 54a on the high voltage side. Accordingly, the total torque of the drive shaft 36 becomes smaller as the driving torque as the vehicle speed V becomes higher.

Figure 4:
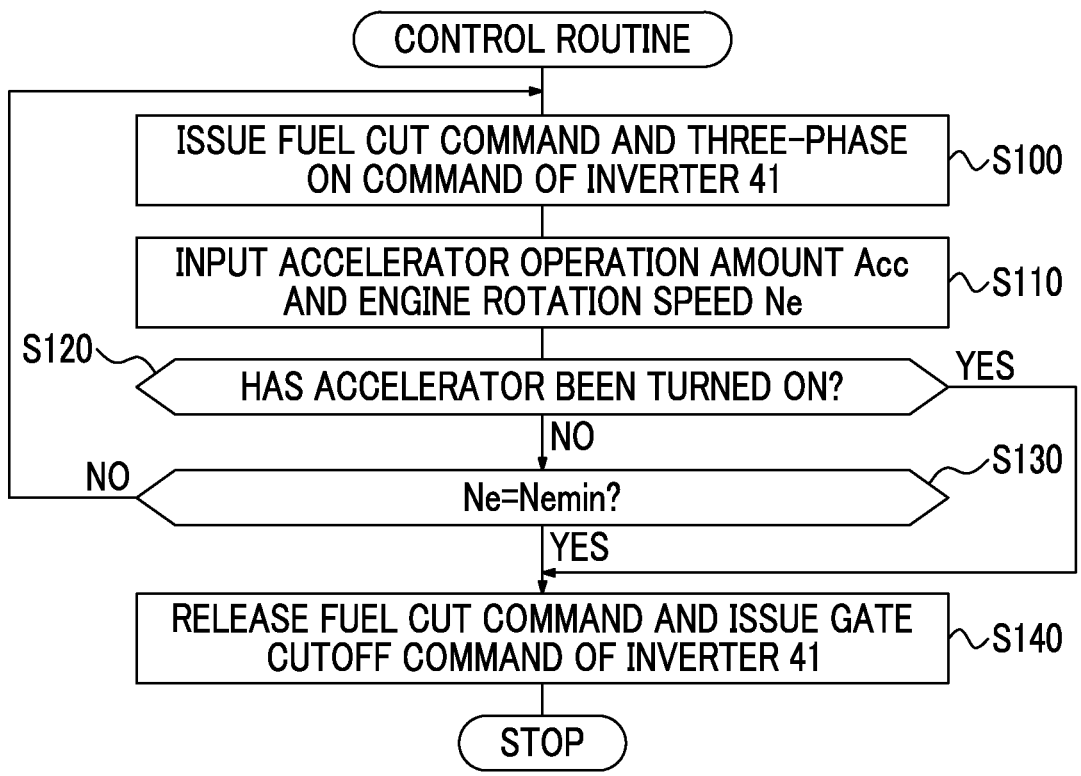
FIG. 4 is a flowchart illustrating an example of a control routine which is performed by a hybrid electronic control unit when an accelerator is turned off during inverterless traveling of the hybrid vehicle.

An operation of the hybrid vehicle 20 according to the embodiment having the above-mentioned configuration, particularly, an operation when the accelerator is turned off during inverterless traveling, will be described below. FIG. 4 is a flowchart illustrating an example of a control routine which is performed by the HVECU 70 when the accelerator is turned off during inverterless traveling. This routine is performed when the accelerator is turned off during inverterless traveling. When the accelerator is turned off, the step-up/down converter 55 or the second inverter 42 is controlled in the same way as when the accelerator is turned on by cooperative control of the HVECU 70 and the motor ECU 40.

When this routine is performed, the HVECU 70 transmits a fuel-cut command to the engine ECU 24 and transmits a three-phase ON command of the first inverter 41 to the motor ECU 40 (Step S100). When the fuel-cut command is received, the engine ECU 24 stops injection of fuel (fuel injection) of the engine 22. When the three-phase ON command of the first inverter 41 is received, the motor ECU 40 turns on all the transistors of one arm of upper-arm transistors (T11 to T13) and lower-arm transistors (T14 to T16) in the first inverter 41.

Figure 5:
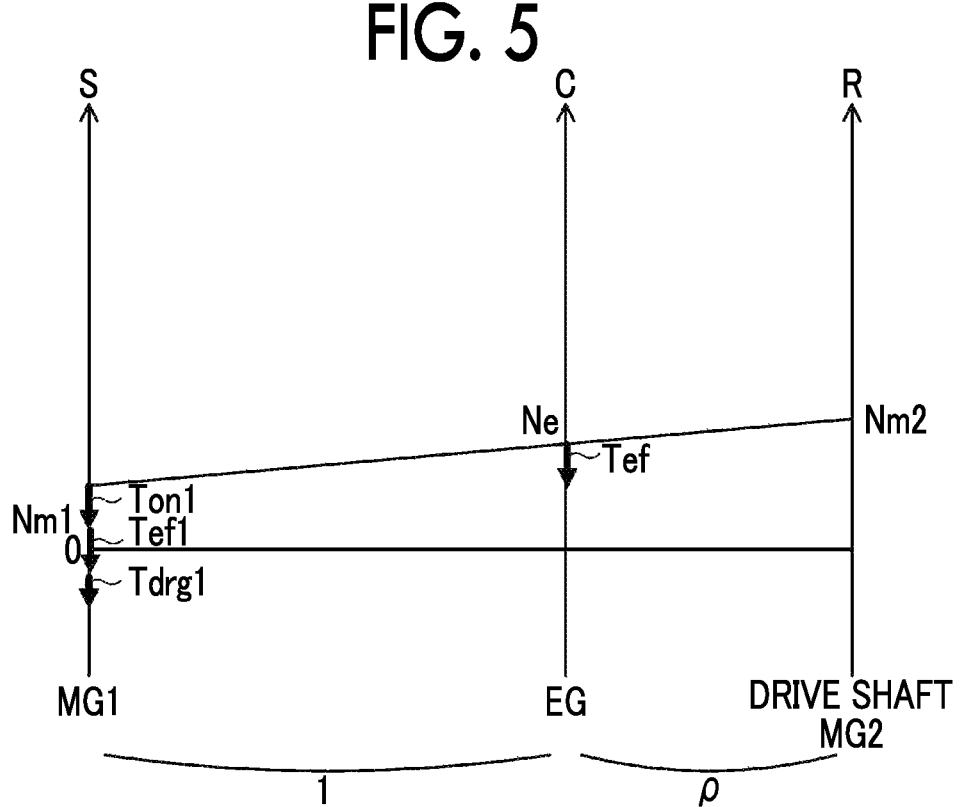
FIG. 5 is a diagram illustrating an example of a nomogram of the planetary gear set when the counter electromotive voltage of the first motor is equal to or lower than the voltage of the power lines on the high voltage side in a state in which injection of fuel of the engine is stopped and the first inverter is turned on in three phases in FIG. 1.

FIG. 5 is a diagram illustrating a nomogram of the planetary gear set 30 when the counter electromotive voltage Vcef1 of the first motor MG1 is equal to or lower than the voltage VH of the power lines 54a on the high voltage side in a state in which the injection of fuel of the engine 22 is stopped and the first inverter 41 is turned on in three phases. In FIG. 5, the torque acting on the drive shaft 36 such as the regenerative torque Tcef2 of the second motor MG2 (which may or may not be generated depending on the rotation speed Nm2 of the second motor MG2) is not illustrated. When the first inverter 41 is turned on in three phases, the rotation speed Nm1 of the first motor MG1 can be decreased by the drag torque Tdrg1 of the first motor MG1, a torque Ton1 in a direction in which the absolute value of the rotation speed Nm1 of the first motor MG1 decreases, and a torque Tef1 which is obtained by outputting the friction torque Tef of the engine 22 to the rotary shaft of the first motor MG1 via the planetary gear set 30. In general, the first motor MG1 has better control responsiveness than the engine 22. Accordingly, by decreasing the rotation speed of the first motor MG1 using the drag torque Tdrg1, the torque Ton1, and the torque Tef1, the rotation speed Nm1 can be more rapidly decreased than by decreasing the rotation speed of the first motor MG1 through control of the rotation speed of the engine 22 while cutting off the gates of the first inverter 41 and causing the engine 22 to operate. The drag torque Tdrg1 is less when the rotation speed Nm1 of the first motor MG1 is low than when the rotation speed Nm1 is high. Accordingly, the drag torque Tdrg1 can be rapidly decreased by rapidly decreasing the rotation speed N1 of the first motor MG1.

Subsequently, the accelerator operation amount Acc and the rotation speed Ne of the engine 22 are input (Step S110). Here, a value detected by the accelerator pedal position sensor 84 is input as the accelerator operation amount Acc. As the rotation speed Ne of the engine 22, a value calculated by the engine ECU 24 based on the crank angle θcr from the crank position sensor 23 is input by communication.

When the accelerator operation amount Acc and the rotation speed Ne are input, it is determined whether the accelerator has been turned on (Step pS120) and it is determined whether the rotation speed Ne of the engine 22 has reached an allowable lower-limit rotation speed Nemin (Step S130). In Step S120, when the accelerator operation amount Acc is equal to or greater than a predetermined value Aref, it is determined that the accelerator is turned on. Here, the predetermined value Aref is a threshold value that is used to determine whether the accelerator has been turned on and is set to, for example, 1%, 3%, or 5%. The allowable lower-limit rotation speed Nemin is a lower limit of a rotation speed range in which the engine 22 can autonomously operate and, for example, 900 rpm, 1000 rpm, or 1100 rpm may be used.

When it is determined in Step S120 that the accelerator has not been turned on and it is determined in Step S130 that the rotation speed Ne of the engine 22 has not reached the allowable lower-limit rotation speed Nemin, the control routine returns to Step S100 and Steps S100 to S130 are repeatedly performed until it is determined in Step S120 that the accelerator has been turned on or it is determined in Step S130 that the rotation speed Ne of the engine 22 has reached the allowable lower-limit rotation speed Nemin. Accordingly, stopping of the injection of fuel of the engine 22 and the turning-on state in three phases of the first inverter 41 can be maintained.

Figure 6:
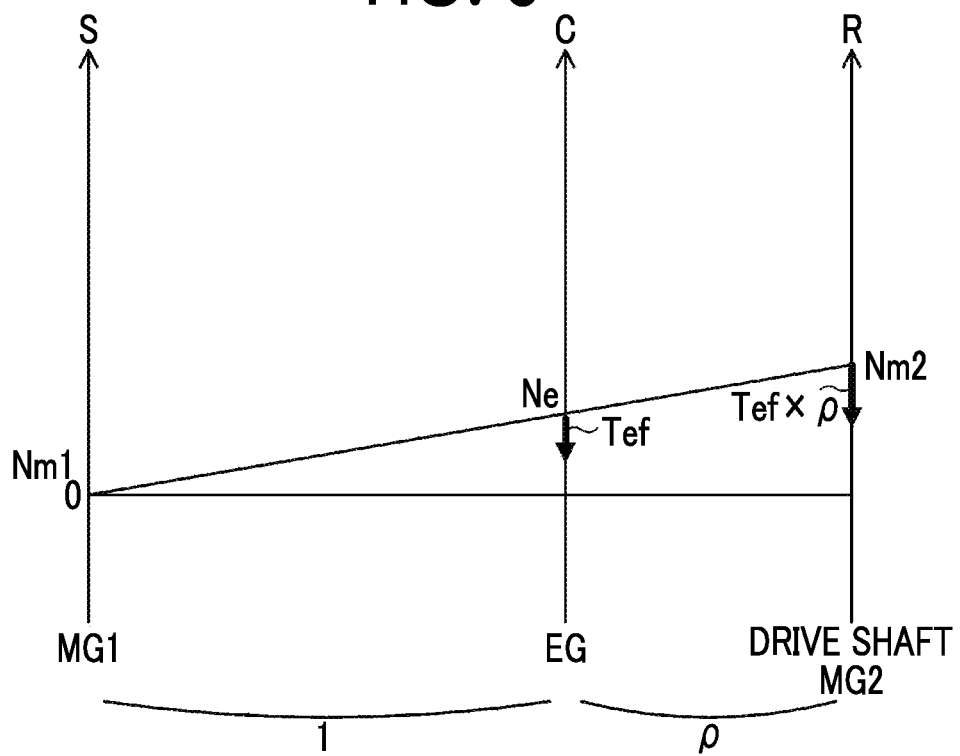
FIG. 6 is a diagram illustrating an example of a nomogram of the planetary gear set when the state in which injection of fuel of the engine is stopped and the first inverter is turned on in three phases in FIG. 1 is maintained.

FIG. 6 is a diagram illustrating an example of a nomogram of the planetary gear set 30 when stopping of the injection of fuel of the engine 22 and the turning-on state in three phases of the first inverter 41 are maintained. In FIG. 6, the regenerative torque Tcef2 of the second motor MG2 (which may or may not be generated depending on the rotation speed Nm2 of the second motor MG2) is not illustrated. As illustrated in the drawing, when the turning-on state in three phases of the first inverter 41 is maintained, the rotation speed Nm1 of the first motor MG1 becomes a value of zero. Thereafter, when the rotation speed Nm1 of the first motor MG1 departs from the value of zero, a torque in a direction in which the rotation speed Nm1 approaches the value of zero acts on the rotary shaft of the first motor MG1 and thus the rotation speed Nm1 of the first motor MG1 is maintained within a predetermined rotation speed range including the value of zero. Accordingly, the friction torque Tef of the engine 22 can be output as a braking torque (=Tef×ρ) to the drive shaft 36 via the planetary gear set 30. Accordingly, it is possible to output the braking torque to the drive shaft 36.

When it is determined in Step S120 that the accelerator has been turned on, the fuel-cut command is released and a gate cutoff command of the first inverter 41 is transmitted the motor ECU 40 (Step S140), and then this routine ends. When the fuel-cut command is released, the engine ECU 24 restarts injection of fuel of the engine 22 and performs the same control of the engine 22 as when the accelerator is turned on. When the gate cutoff command of the first inverter 41 is received, the motor ECU 40 cuts off the gates of the first inverter 41. Accordingly, the hybrid vehicle can travel by inverterless traveling and can travel using a reaction torque (a driving torque) with respect to the regenerative torque Tcef1 of the first motor MG1 or the drag torque Tdrg1 of the first motor MG1.

When it is determined in Step S120 that the accelerator has not been turned on and it is determined in Step S130 that the rotation speed Ne of the engine 22 has reached the allowable lower-limit rotation speed Nemin, the fuel-cut command is released and the gate cutoff command of the first inverter 41 is transmitted to the motor ECU 40 (Step S140), and then this routine ends. When the fuel-cut command is released, the engine ECU 24 restarts injection of fuel of the engine 22. When the gate cutoff command of the first inverter 41 is received, the motor ECU 40 cuts off the gates of the first inverter 41. Accordingly, it is possible to prevent the rotation speed Ne of the engine 22 from becoming the allowable lower-limit rotation speed Nemin.

In the hybrid vehicle 20 according to the embodiment, when the accelerator is turned off during inverterless traveling, it is possible to rapidly decrease the drag torque Tdrg1 of the first motor MG1 by turning on the first inverter 41 in three phases and stopping the injection of fuel of the engine 22.

When the rotation speed Ne of the engine 22 reaches the allowable lower-limit rotation speed Nemin in a state in which the first inverter 41 is turned on in three phases and the injection of fuel of the engine 22 is stopped by turning off the accelerator during inverterless traveling, it is possible to prevent the rotation speed Ne of the engine 22 from becoming the allowable lower-limit rotation speed Nemin by cutting off the gates of the first inverter 41 and restarting the injection of fuel of the engine 22.

When the accelerator is turned on in the state in which the injection of fuel of the engine 22 is stopped and the first inverter 41 is turned on in three phases by turning off the accelerator during inverterless traveling, the hybrid vehicle can travel using a reaction torque (a driving torque) with respect to the regenerative torque Tcef1 or the drag torque Tdrg1 of the first motor MG1 by cutting off the gates of the first inverter 41 and restarting the injection of fuel of the engine 22.

When the accelerator is turned off during inverterless traveling and the braking torque is output to the drive shaft 36, it is possible to output the braking torque to the drive shaft 36 via the planetary gear set 30 by stopping the injection of fuel of the engine 22 and turning on the first inverter 41 in three phases to maintain the rotation speed Nm1 of the first motor MG1 within a predetermined rotation speed range.

In the hybrid vehicle 20 according to the embodiment, when the accelerator is turned on during inverterless traveling, the target rotation speed Nm1* of the first motor MG1 is set to the predetermined rotation speed Nm1 set and the target voltage VH* of the power lines 54a on the high voltage side is set to the predetermined voltage VHset. However, the target rotation speed Nm1* of the first motor MG1 and the target voltage VH* of the power lines 54a on the high voltage side may be set such that the absolute value of the regenerative torque Tcef1 of the first motor MG1, that is, the absolute value of the driving torque of the drive shaft 36, increases as the accelerator operation amount Acc increases.

The hybrid vehicle 20 according to the embodiment includes the step-up/down converter 55, but may not include the step-up/down converter 55.

In the hybrid vehicle 20 according to the embodiment, the battery 50 is used as a power storage device, but any device may be used as long as it is a device that is rechargeable such as a capacitor.

The hybrid vehicle 20 according to the embodiment includes the engine ECU 24, the motor ECU 40, the battery ECU 52, and the HVECU 70, but at least two thereof may be configured as a single electronic control unit.

Correspondence between principal elements of the embodiment and principal elements of the disclosure described in the SUMMARY will be described below. In the embodiment, the engine 22 is an example of the "engine." The first motor MG1 is an example of the "first motor." The planetary gear set 30 is an example of the "planetary gear set." The second motor MG2 is an example of the "second motor." The first inverter 41 is an example of the "first inverter." The second inverter 42 is an example of the "second inverter." The battery 50 is an example of the "power storage device." The HVECU 70, the engine ECU 24, and the motor ECU 40 are examples of the "electronic control unit."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noticed that the disclosure described in the SUMMARY has to be analyzed based on description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to industries for manufacturing hybrid vehicles and the like.

What is claimed is:
1. A hybrid vehicle comprising:
an engine;
a first motor configured to generate a counter electromotive voltage with rotation of the first motor;
a second motor configured to input and output power to and from a drive shaft connected to an axle of the hybrid vehicle;

a planetary gear set of which three rotary elements are connected to three shafts of the first motor, the engine, and the drive shaft such that the first motor, the engine, and the drive shaft are arranged in the order of the first motor, the engine, and the drive shaft in a nomogram;
a first inverter configured to drive the first motor;
a second inverter configured to drive the second motor;
a power storage device connected to the first inverter and the second inverter via power lines; and
an electronic control unit configured to:
  (i) control the engine, the first inverter, and the second inverter, and
  (ii) turn on the first inverter in three phases and stop injection of fuel of the engine when an accelerator is turned off during predetermined traveling in which the hybrid vehicle is traveling with gates of the first inverter and the second inverter cut off and with the engine operating.

2. The hybrid vehicle according to claim 1, wherein the electronic control unit is configured to turn off all transistors of the first inverter and the second inverter to cut off the gates of the first inverter and the second inverter.

3. The hybrid vehicle according to claim 1, wherein the electronic control unit is configured to turn on the first inverter in three phases by turning on all arm transistors of any one of upper-arm transistors and lower-arm transistors in the second inverter.

4. The hybrid vehicle according to claim 1, wherein the electronic control unit is configured to cut off the gates of the first inverter and to restart injection of fuel of the engine to travel in the predetermined traveling when a rotation speed of the engine reaches a lower limit of a rotation speed range in which the engine is able to autonomously operate in a state in which, by turning off an accelerator during the predetermined traveling, the first inverter is turned on in three phases and injection of fuel of the engine is stopped.

5. The hybrid vehicle according to claim 1, wherein the electronic control unit is configured to cut off the gates of the first inverter and to restart injection of fuel of the engine to travel in the predetermined traveling when an accelerator is turned on in a state in which, by turning off an accelerator during the predetermined traveling, the first inverter is turned on in three phases and injection of fuel of the engine is stopped.

6. The hybrid vehicle according to claim 1, wherein the electronic control unit is configured to stop injection of fuel of the engine and to turn on the first inverter in three phases such that a rotation speed of the first motor is maintained within a predetermined rotation speed range when an accelerator is turned off during the predetermined traveling and a braking torque is output to the drive shaft.

7. A control method of a hybrid vehicle, the hybrid vehicle including:
an engine;
a first motor configured to generate a counter electromotive voltage with rotation of the first motor;
a second motor configured to input and output power to and from a drive shaft connected to an axle of the hybrid vehicle;
a planetary gear set of which three rotary elements are connected to three shafts of the first motor, the engine, and the drive shaft such that the first motor, the engine, and the drive shaft are sequentially arranged in the order of the first motor, the engine, and the drive shaft in a nomogram;
a first inverter configured to drive the first motor; and
a second inverter configured to drive the second motor,
the control method comprising:
  (i) controlling the engine, the first inverter, and the second inverter; and
  (ii) turning on the first inverter in three phases and stopping injection of fuel of the engine when an accelerator is turned off during predetermined traveling in which the hybrid vehicle is traveling with gates of the first inverter and the second inverter cut off and with the engine operating.

* * * * *